Aug. 21, 1951 W. H. WANNAMAKER, JR 2,564,937
CONTROL APPARATUS
Filed Aug. 31, 1946 5 Sheets-Sheet 1

*INVENTOR.*
WILLIAM H. WANNAMAKER JR.
BY Arthur H. Swanson
ATTORNEY.

Aug. 21, 1951 W. H. WANNAMAKER, JR 2,564,937
CONTROL APPARATUS
Filed Aug. 31, 1946 5 Sheets—Sheet 2

FIG. 2

INVENTOR
WILLIAM H. WANNAMAKER JR.

BY Arthur H. Swanson

ATTORNEY.

Aug. 21, 1951 W. H. WANNAMAKER, JR 2,564,937
CONTROL APPARATUS
Filed Aug. 31, 1946 5 Sheets-Sheet 3

*INVENTOR.*
WILLIAM H. WANNAMAKER JR.
BY
Arthur H. Swanson
ATTORNEY.

Aug. 21, 1951  W. H. WANNAMAKER, JR  2,564,937
CONTROL APPARATUS

Filed Aug. 31, 1946  5 Sheets-Sheet 4

*INVENTOR.*
WILLIAM H. WANNAMAKER JR.
BY
Arthur H. Swanson
ATTORNEY.

Aug. 21, 1951 W. H. WANNAMAKER, JR 2,564,937
CONTROL APPARATUS

Filed Aug. 31, 1946 5 Sheets-Sheet 5

*INVENTOR.*
WILLIAM H. WANNAMAKER JR.
BY
Arthur H. Swanson
ATTORNEY.

Patented Aug. 21, 1951

2,564,937

UNITED STATES PATENT OFFICE 2,564,937

CONTROL APPARATUS

William H. Wannamaker, Jr., Flourtown, Pa., assignor, by mesne assignments, to Minneapolis-Honeywell Regulator Company, Minneapolis, Minn., a corporation of Delaware Application August 31, 1946, Serial No. 694,401

18 Claims. (Cl. 250—36)

1

The general object of the present invention is to provide improved control systems and apparatus of the type in which control actions are effected through an electronic valve and associated means by which said valve is caused to operate, or not to operate, as an oscillator, accordingly as a control quantity or condition has one or another value. The control quantity or condition may be a temperature, pressure, velocity, weight or other quantity or condition adapted to give movement to a control element on a small change in the value of said control quantity or condition. In such apparatus, the plate current through the valve is substantially smaller when the valve is acting as an oscillator than when not so acting and control actions are ordinarily effected by relay mechanism including a relay winding in the plate circuit of the valve which is responsive to variations in said plate current.

A primary object of the present invention is to provide a control system and control apparatus comprising improvements over control systems and apparatus of the above mentioned type which are disclosed in my prior application, Ser. No. 541,575, filed June 22, 1944 and now issued as U. S. Patent 2,531,313.

A common characteristic of the control apparatus disclosed in said prior application, and of my improved apparatus disclosed herein, is the control of the oscillating tube by the use of a vane which extends into a kerf-like space between flat spiral inductance coils and is movable to vary the extent of its interposition between said coils so as to vary the mutual inductance of the coils between values at which the oscillator tube will and will not oscillate. A specific object of the present invention is to increase the sensitivity and stability of operation of such control apparatus.

While in the preferred form of the present invention, use is made of the characteristic inductance coil and vane arrangement of the prior application, the novel circuit arrangement provided in accordance with the present invention, permits of an oscillator control so sharp that the oscillating tube may be caused to oscillate or to cease from oscillation, by a movement of the edge of the vane within the space between the inductance coils which is substantially smaller than is required with the control systems disclosed in the prior application. The greater sensitivity of the oscillator control characterizing the present invention, permits of a desirable simplification of the control apparatus.

2

One practically important object of the present invention is to combine for parallel operation with the valve operating intermittently as an oscillator, a non-oscillating power amplifying valve. With this combination, the non-oscillating valve may supply a substantial portion of the power required for the control effect produced when the other valve ceases to operate as an oscillator, without interfering with the capacity of the apparatus to interrupt or reverse said control effect as soon as said other valve starts to oscillate. The power thus furnished by the non-oscillating valve may be wholly utilized in increasing the magnitude of the circuit control effect of the two valves or it may be utilized in part for that purpose and in part to reduce the power which the oscillator valve is required to contribute to the control effect.

A specific object of the present invention is to so combine the intermittently oscillating valve and the non-oscillating power amplifying valve that the plate current in the latter will be higher when the other valve is not oscillating than when it is oscillating. Other specific and practically important objects of the invention are to provide circuit arrangements in which the electronic device employed may be a twin triode tube of commercially available type having one only of its two triode valves operating as an intermittent oscillator; and in which both valves operate in parallel to collectively provide a control force during periods in which said one valve is not oscillating, which is stronger than can be maintained by the two valves when the oscillator valve is oscillating; and in which the oscillating current flow through the oscillating valve subjects the control grid of the latter to a degenerating effect.

The various features of novelty which characterize my invention are pointed out with particularity in the claims annexed to, and forming a part of this specification. For a better understanding of the invention, however, its advantages, and specific objects attained by its use, reference should be had to the accompanying drawings and descriptive matter in which I have illustrated and described preferred embodiments of the invention.

Figure 1:
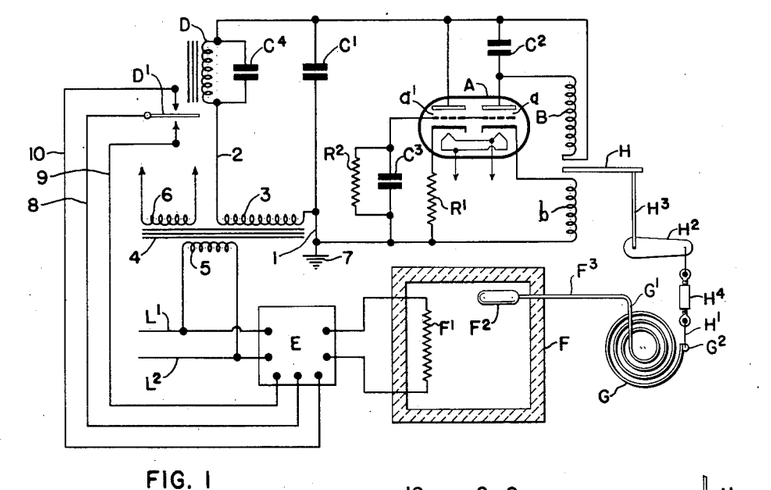
Fig. 1 is a diagram illustrating a preferred form of my improved circuit arrangement.

In the preferred circuit arrangement shown diagrammatically in Fig. 1, a twin valve, electronic tube A, which may be of the commercially available 7N7 type, encloses two triode valves $a$ and $a'$. The valve $a$ does, or does not operate as an oscillator, depending on the mutual inductance of suitably disposed inductance coils B and $b$. The mutual inductance of said coils is varied in accordance with variations in a controlling condition as hereinafter explained. The valve $a$ and $a'$. The valve $a$ does, or does not operate as tion of operation. The valves $a$ and $a'$ are connected between, and are supplied with plate current by the terminals 1 and 2 of the secondary winding 3 of a transformer 4. The secondary winding 3 is connected in parallel with a by-pass condenser $C_1$. The primary winding 5 of the transformer 4 is connected to alternating current supply conductors $L'$ and $L^2$ which may be branches of an ordinary electric light or power system supplying current at about 115 volts and a frequency of about 60 cycles per second. As shown, the transformer 4 has another secondary winding 6 adapted to supply cathode heating current to the heater filaments of the tube A.

The transformer terminal 1 is connected to ground at 7. The condenser $C_1$ connects the grounded terminal to the anode of valve $a'$ directly, and connects said terminal to the anode of valve $a$ through the coil B and the condenser $C_2$ in parallel with that coil. The cathode of valve $a$ is connected to ground through the coil $b$. The cathode of valve $a'$ is connected to ground through a bias resistor $R_1$. The control grids of the two valves $a$ and $a'$ are connected to ground through a resistance $R_2$ and a by-pass condenser $C_3$ in parallel therewith. The transformer terminal 2 is connected to the anodes of the valves $a$ and $a'$, and to the ungrounded side of the condenser $C_1$ by the winding D of a control relay and a condenser $C_4$ in parallel therewith. The condenser $C_4$ prevents the relay from chattering as a result of the pulsating current flowing through it due to the A. C. energization of the oscillator.

A relay armature contact $D'$ connected to a relay conductor 8, is biased for engagement with a contact connected to a relay conductor 9 when the relay winding D is not operatively energized, and when that winding is operatively energized it moves the contact $D'$ into engagement with a contact connected to a relay conductor 10.

As shown in Fig. 1, the conductors 8, 9 and 10 are connected to an auxiliary relay E which may be of conventional type and is employed to operatively connect the heating coil $F'$ of an electric furnace F to the alternating current supply conductors $L'$ and $L^2$, when the winding D is energized and the contact $D'$ connects relay conductors 8 and 10. The relay E disconnects the heating coil $F'$ from said supply conductors when the relay winding D is deenergized and permits contact $D'$ to connect relay conductors 8 and 9.

In the arrangement shown diagrammatically in Fig. 1, the mutual inductance of coils B and $b$ is varied in predetermined accordance with variations in the temperature of the furnace F by means including a Bourdon tube G of spiral form. The Bourdon tube G has a stationary end $G'$ to which the fluid pressure in a thermometer bulb $F^2$ in the chamber of the furnace F is transmitted by a tube $F^3$. The movable end $G^2$ of the Bourdon tube is mechanically connected through a link $H'$, crank arm $H^2$ and shaft $H^3$ to a control element H. As diagrammatically shown, the link $H'$ is made adjustable in length by its inclusion of a turn buckle $H^4$. As the temperature in the furnace F rises and falls, the fluid pressure in the bulb $F^2$ increases and decreases and moves the element H relatively to the coils B and $b$ to respectively increase and decrease the mutual inductance of those coils and thereby cause the valve to act respectively as an oscillator and as a non-oscillating valve.

Figure 2:
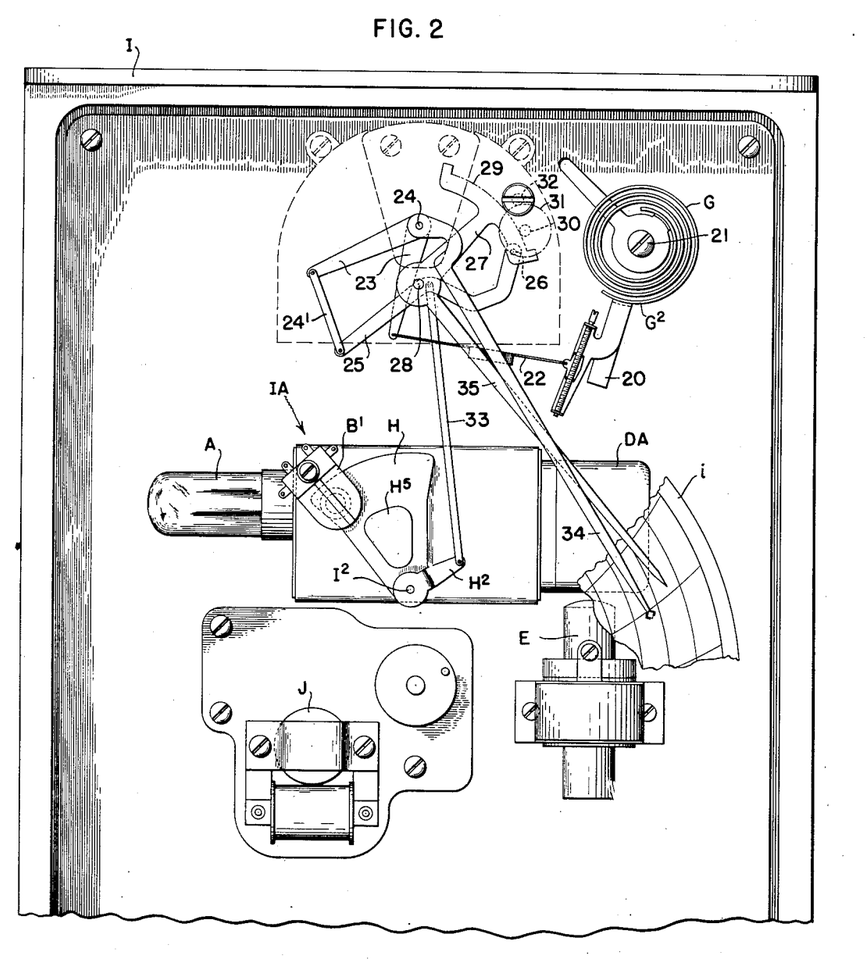
Fig. 2 is an elevation with parts broken away of a portion of a control instrument adapted for use in a contral system including the circuit arrangement of Fig. 1.
Figures 3, 4:
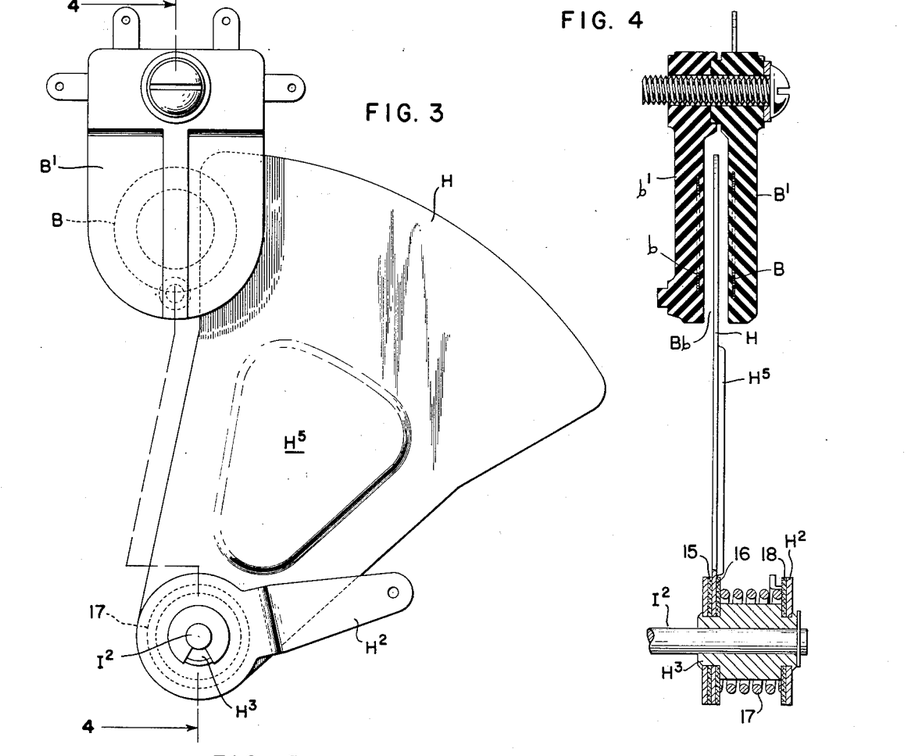
Fig. 3 is an elevation on a larger scale of the inductance coil and vane arrangement shown in Fig. 2.
Fig. 4 is an elevation taken at right angles to Fig. 3 and partly in section on the broken line 4—4 of Fig. 3.

Desirable forms and dispositions of the coils B and $b$ and element H, and a desirable form of operating connection between the vane H and Bourdon tube G are illustrated in Figs. 2, 3 and 4. The specific form and arrangement of the coils B and $b$ illustrated in Figs. 2, 3, and 4 comprise no part of the present invention, but are disclosed and claimed in the Booth application, Serial No. 694,344, filed on even date herewith, and now Patent No. 2,511,897 issued June 20, 1950. In that patent, it is stated by way of illustration and example that the coil assembly disclosed therein may have the following construction. The coil corresponding to the coil B may comprise 9½, and the coil corresponding to the coil $b$ may comprise 7½, convolutions or turns of No. 31, B & S gauge copper wire. The inside diameter of the inner convolution of each coil may be ⅜″, and the maximum width of each element, corresponding to the elements $B'$ and $b'$, may be about ⅞″. The space $Bb$ between the element faces may be ⅛″. In Fig. 2, I represent the rectangular housing or casing of a control instrument in which is mounted a chart motor J for rotating a record chart $i$. The Bourdon tube G, the auxiliary relay E of Fig. 1 and a control unit assembly IA are mounted in the instrument casing I. The control unit assembly IA comprises a box-like body with a socket in one end wall for the tube A, and a casing DA attached to its other end enclosing the relay winding D and associated relay parts. The inductance coils B and $b$ are incorporated in separable sections $B'$ and $b'$ of a coil unit. The latter is external to the unit housing IA, and is clamped against a lateral wall of the latter by a screw.

As shown in Figs. 3 and 4, the spiral coils B and $b$ are coaxial and are embedded in the respective sections $B'$ and $b'$ which are formed of resinous plastic material. The coils B and $b$ are adjacent and alongside parallel side walls of the corresponding sections $B'$ and $b'$, which are separated by a narrow kerf-like space $Bb$ into which an edge portion of the element H normally extends. As shown, the vane H is a sector shaped piece of sheet metal of good conductivity, such as copper or aluminum, stamped to laterally displace a portion $H^5$ of the vane to give the latter greater strength and rigidity. In the form shown in Figs. 3 and 4, the vane shaft $H^3$ is a tubular part surrounding and journalled on a post I² which has one end anchored to the adjacent side of the housing structure IA. The arm H² is rigidly secured to one end of the shaft H³ and the vane H is frictionally secured to the other end of said shaft. This facilitates relative angular adjustments of the crank arm H² and vane H for calibration purposes. As shown in Fig. 4, the frictional connection between the shaft H³ and vane H comprises a washer 15 which surrounds and is secured to the end of the shaft H³ remote from the arm H². The vane H is formed with an opening snugly receiving the shaft H³ and is frictionally held between the washer 15 and a washer 16. The latter is interposed between the vane H and the end of a helical compression spring 17 surrounding the shaft H³ and extending between the washer 16 and a washer 18 secured to the adjacent side of the crank arm H².

The operative connection between the movable end G² of the Bourdon tube G and link H' as shown in Fig. 2, is not a simple pivot but is a link and lever arrangement which comprises numerous parts, and is of a well known type used in instruments of various forms in which a movable controlling element adjusts a control element through a reciprocating link. As shown in Fig. 2, the movable end G² of the Bourdon tube G is secured to an arm 20 turning about a pivot 21 extending centrally through the Bourdon G and anchoring the latter to the back wall of the instrument housing I. The free end of the arm 20 is connected by a link 22 to one arm of a lever 23 which is pivoted to turn about the axis of the pen shaft 24 of the instrument. The lever 23 is connected by a link 24' to one end of a lever 25. The other end of the lever 25 is connected by a pivot pin 26 to an element 27 angularly adjustable about its supporting pivot 28. The member 27 comprises a spur gear segment 29 which is connected through intermediate gears 30 and 31 to a spur gear 32 which is manually rotatable as by means of a screw driver to thereby angularly adjust the end of the lever 25 connected to the pivot 26 about the axis of the pivot 28. Intermediate its ends, the lever 25 is pivotally connected to one end of a link 33 serving the purpose of the link H' of Fig. 1. The other end of link 33 is connected to the free end of the crank arm H².

The instrument I comprises a pen arm 34 which is mounted on the pen shaft 24, and shares the angular movements of the lever 23, and records the varying furnace temperatures on the chart $i$. The element 27 also includes an index or pointer 35 which indicates on the scale of the chart $i$ the temperature or other controlling condition value which the apparatus is adjusted to maintain.

In the intended operation of the apparatus shown in Fig. 1, the relay winding D is energized and heating current is supplied to the coil F' during periods in which the temperature in the furnace chamber is below a predetermined value, and the winding D is deenergized and the current supply to the heating coil F' is interrupted during periods in which the furnace temperature is not below said predetermined value. The predetermined value may be varied as conditions require by a rotation of the turn buckle H⁴ to thereby change the length of the link H'. The same adjustment of the predetermined temperature is attained with the apparatus shown in Fig. 2, by the manual rotation of the control point adjustment gear 32. When at the end of a period of operation in which the furnace temperature is low, the increase in the fluid pressure transmitted from the bulb F² to the Bourdon tube G, causes the free end G² of the latter to turn clockwise, as seen in Fig. 1, and thereby turns the vane H into the position in which mutual inductance of the coils B and $b$ is so increased that the valve $a$ begins to oscillate. This deenergizes the relay winding D, whereupon the contact D' moves out of engagement with the relay conductor 10 and into engagement with the relay conductor 9. This results in an operation of the auxiliary relay E which interrupts the current supply to the heating coil F'.

When, thereafter, the temperature of the bulb F² falls below the predetermined value, the resultant reduction in the pressure in bulb F² causes the free end of the Bourdon tube G of Fig. 1 to move in the conter-clockwise direction, so that the vane H is moved in the direction to decrease the mutual inductance of the coils B and $b$, and thereby interrupt the oscillation of the valve $a$. When the oscillation of the valve $a$ is thus interrupted, the current flowing through the relay winding D increases, and the armature contact D' is drawn into the position in which it is out of engagement with the conductor 9 and is in engagement with the conductor 10 so that the auxiliary relay E is actuated to again supply heating current to the winding F'.

The effect of the ground connection to the control grids of the valves $a$ and $a'$ formed by the resistor $R_2$ and condenser $C_3$, is to continuously maintain those grids at ground potential for the high frequencies at which the oscillator operates. With the cathode of the valve $a$ connected to ground through the coil $b$, and with the anode of the valve $a$ connected to ground through the coil B and condenser $C_1$, and with the cathode of the valve $a'$ connected to ground through the bias resistor $R_1$, the high frequency potential difference between the control grid and cathode of each of the valves $a$ and $a'$ varies as a result of variations in the potential difference between that cathode and ground. Oscillation of the valve $a$ is created and maintained by the transfer of energy from the output circuit to the input circuit of the valve $a$ by virtue the coupling between coils B and $b$. The capacity of that coupling to transfer energy depends upon and is controlled by the mutual inductance of the coils B and $b$. Their mutual inductance is varied by the adjustment of the vane H.

Advantageously, the circuit elements are so proportioned and arranged that with one edge of the vane H in one position in which it is in close proximity to the common axis of the coils B and $b$, as shown in Fig. 3, the valve $a$ will not act as an oscillator, but when said vane edge is moved into a second position slightly further away from said axis, the valve $a$ will act as an oscillator. The oscillation frequency of the valve $a$ is approximately the resonance frequency of the tuned circuit portion formed by the coil B and the condenser $C_2$ in parallel with the coil, by the distributed capacity of the inter-connecting wires, and the plate to ground capacity of the oscillator tube, and may be 30 megacycles or so. The condenser $C_1$ prevents high frequency oscillation currents from passing through the relay winding D and the transformer secondary winding 3. When the valve $a$ is acting as an oscillator, the oscillation circuit includes the cathode of the valve $a$, coil $b$, conductor 1, condenser $C_1$ coil B and the condenser $C_2$ in parallel therewith, and the anode of the valve $a$. It is to be noted, however, that the series connected condensers $C_1$, $C_3$ and the plate-grid capacitance of the valve $a$ form a path of flow for oscillation currents which is in parallel with the condenser $C_2$ and inductance coil B. The capacity of the condenser $C_2$ is so selected relative to the collective capacity of the series connected condensers $C_1$, $C_3$ and the capacitance of the plate-grid of the valve $a$, to make the oscillating current frequency dependent on the condenser $C_2$.

While the valve $a$ is, and the valve $a'$ is not in the oscillation circuit, the circuit connections to the two valves are such that the performance of each exercises a certain controlling effect upon the performance of the other. When the valve $a$ is oscillating, the average D. C. grid bias on that valve is considerably negative with respect to its associated cathode, due to the flow of grid current through the resistor $R_2$. Due to the action of the condenser $C_3$ the D. C. bias on the control grid of the valve $a$ is substantially constant while that valve is oscillating. Owing to the direct connection of the control grid of the valve $a$ to the control grid of the valve $a'$, the oscillation of the valve $a$ and resultant flow of grid current through $R_2$ makes the control grid of the valve $a'$ more negative relative to the cathode of the valve $a'$ than it is when the valve $a$ is not oscillating. The oscillation of the valve $a$ thus limits the low frequency pulsating current flowing in series through the valve $a'$ and through the relay winding D and condenser $C_4$ in parallel with that winding.

When an adjustment of the vane H interrupts the oscillation of the valve $a$, the low frequency current flow through the valve $a'$ is increased, being then controlled by the cathode bias of the valve $a'$ due to the current flow through the resistor $R_1$. That cathode bias makes the control grid of the valve $a'$ less negative relative to the cathode of the valve than does the potential drop through the resistance $R_2$ occurring when the valve $a$ is oscillating. The low frequency plate current flow through the valve $a$ created by the power transformer 4, does not create any appreciable or significant bias effect on the valve $a$ since the cathode inductance coil $b$ has a practically negligible D. C. resistance.

The high frequency current flow through the valve $a$ produces an alternating voltage across the cathode coil B which is degenerative in character, but is not really a bias voltage. That alternating voltage varies with the high frequency oscillation current and may be regarded as a degenerative high frequency signal impressed on the input circuit of the valve $a$. The degenerative effect of the high frequency voltage developed across the cathode inductance coil $b$ when the valve $a$ is oscillating, neutralizes a portion of the regenerative high frequency voltage induced in the coil $b$ by the coil B, and thus contributes directly to a reduction in the movement of the vane H required to establish and interrupt oscillation of the valve $a$. The valve $a'$ contributes to the stability of operation of the control system shown in Fig. 1, and to a reduction in the extent of the movement of the vane H necessary to establish and interrupt oscillation of the valve $a$, by reducing the amount of low frequency relay energizing current which the valve $a$ must furnish to produce the relay operation effected when the valve $a$ is not oscillating. The fact that the low frequency current through the valve $a'$ is smaller when the valve $a$ is oscillating than when that valve is not oscillating, also contributes to a reduction in the extent of movement of the vane H required to establish and interrupt oscillation of the valve $a$.

As will be apparent, the means shown in Fig. 1 for controlling the energization of the relay including the winding D, is adapted to fail safely in that, any apparatus failure which prevents the operative energization of the relay winding D, operates just as does an undue increase in the temperature of the furnace F to prevent the supply of heating current to the furnace heating coil F'.

Figure 5:
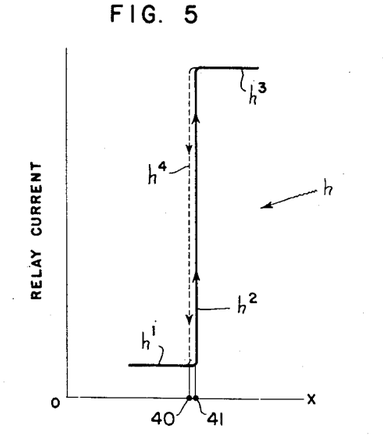
Fig. 5 is a diagram illustrating the current variations produced in the circuit arrangement shown in Fig. 1 by the adjustment of the controlling vane.

The manner in which the plate current through the valve $a$ is varied by adjustments in the position of the vane H is shown diagrammatically in Fig. 5 by the curve $h$. In Fig. 5, the vertical distances between points on the curve $h$ represent differences in the values of the component of the plate current flowing through the valve $a$ which includes no high frequency component and passes through the relay winding D, and may be referred to as the relay current. Distances between points on the horizontal line OX of Fig. 5 represent vane movements between vane positions at which the relay current has the values shown by the points on the curve $h$ directly above corresponding vane position points on the curve OX.

The curve $h$ comprises horizontal lower and upper portions $h'$ and $h^3$, respectively, and parallel transverse connecting portions $h^2$ and $h^4$. The curve portion $h'$ represents the relatively low steady value of the relay current when the vane H is in a position in which it does not interfere with the oscillation of the value $a$. The curve section $h^3$ of the curve $h$ represents the relatively high steady value of the relay current when the position of the vane H is in the range in which it prevents oscillation of the valve $a$. The transverse portion $h^2$ of the curve $h$ represents the changing value of the relay current during the very short time interval in which the oscillation action of the valve $a$ is being terminated. The section $h^4$ of the curve $h$ represents the changing value of the relay current during the very short period in which oscillation of the valve $a$ is initiated and the oscillation amplitude builds up to its normal maximum value. The arrows applied to the curve sections $h^2$ and $h^4$ are indicative of the fact that these sections show relay current increases and decreases, respectively.

The curved sections $h^2$ and $h^4$ are almost vertical because substantially all of the transition between the oscillating and non-oscillating condition of the valve $a$ occurs almost instantaneously. The distance between the points 40 and 41 on the line OX represents the travel of the vane H between the position at which it terminates the oscillating condition of the valve $h$ and the position of the vane at which it reestablishes oscillation of the valve with normal maximum oscillation amplitude. The vane travel represented between the points 40 and 41 is about two thousandths of an inch or less. That vane travel is a small fraction only of the vane travel required to establish and interrupt oscillation in any vane control oscillator heretofore developed and put into use, of which I have knowledge.

Since in the practical use of the apparatus disclosed herein the energization and deenergization of the relay winding D does not result from a mere change in the oscillation frequency, but results from the establishment or interruption of the oscillation condition of the valve $a$ by a relatively minute vane movement, the response to movement of the vane through the critical range of its adjustment is sharp and positive. This contributes to operational stability and reliability. It also permits the vane adjustment to be effected through a simple crank arm and link connection to actuating mechanism of any type customarily used in control instruments to actuate an electric switch or an air controller. In this respect the present invention has an important practical advantage over the oscillation controllers disclosed in my above mentioned prior application.

While, some at least, of the values of elements of the circuit shown in Fig. 1 stated below are not regarded as critical, it is noted by way of illustration and example, that excellent operative results are obtainable when the valve A is of the 7N7 type, and the coils B and $b$ have the number of turns, dimension and spacing hereinbefore stated, and when the resistance of the resistor $R_1$ is 500 ohms and the resistance of the resistor $R_2$ is .5 megohm and the capacities of the condensers $C_1$, $C_3$ and $C_4$ are .005, .015 and 8 microfarads, respectively, and the capacity of the condenser $C_2$ is 5 micromicrofarads.

Figs. 6–10 illustrate modifications of the circuit shown in Fig. 1. Symbols used in Fig. 1, are used in Figs. 6–10 to designate corresponding circuit elements, and the latter may have the values stated above for the elements to which the symbols are applied in Fig. 1.

Figures 6, 7:
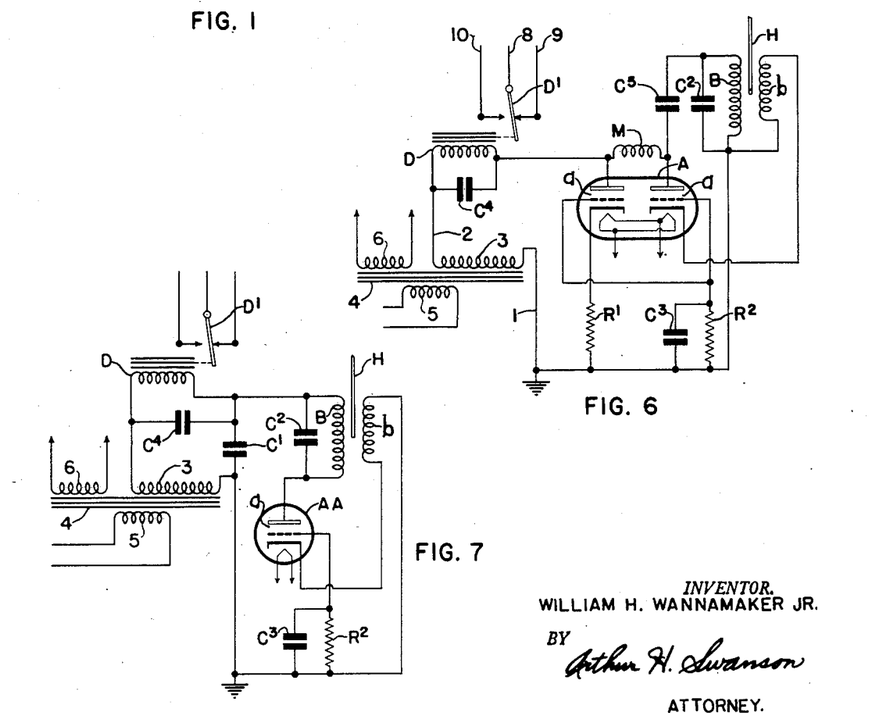
Figs. 6–10, inclusive, are diagrams each illustrating a different modification of the circuit arrangement shown in Fig. 1.

The circuit arrangement shown in Fig. 6 differs from that shown in Fig. 1 primarily in that the anode of the valve $a$ is connected to the relay D and thereby to the transformer terminal 2 through a choke coil M, instead of through the inductance coil B. The Fig. 6 arrangement also differs from Fig. 1 in the omission of the condenser $C_1$, and in having the anode of the valve $a$ connected by a condenser $C_5$ to the coil B with which the condenser $C_2$ is connected in parallel, and in having the second terminal of the coil B connected to ground. In Fig. 1, the coil B, as well as the coil $b$, is connected in the plate circuit of the valve $a$ along with the energizing transformer secondary winding 3. The arrangement shown in Fig. 1 may thus be described as comprising a series fed oscillator, whereas in Fig. 6 the oscillator is fed by the choke coil M. The condenser $C_5$ may have a capacity of 100 micromicrofarads, and the choke coil M may have an inductance of 100 microhenries.

The circuit shown in Fig. 6 has an advantage over that shown in Fig. 1, in that the coil B of Fig. 6 does not have a D. C. potential as high above ground potential as does the coil B of Fig. 1. The arrangement shown in Fig. 6 has the disadvantage, however, that a break in the coil B will prevent the valve $a$ from oscillating, and will thus permit the energization of the relay winding D when the latter should be deenergized. In other words, the Fig. 6 arrangement does not have the safe failure characteristic of the Fig. 1 arrangement.

Fig. 7 diagrammatically illustrates a modification in which the valve $a'$ of Figs. 1 and 6 is omitted, the twin triode tube A of Figs. 1 and 6 being replaced in Fig. 7 by a simple triode tube AA. Except for the omission of the valve $a'$ and its cathode resistor $R_1$, the arrangement shown in Fig. 7 is like the arrangement shown in Fig. 1. The two inductance coils B and $b$ are connected in series in the plate circuit of the valve $a$ of Fig. 7, just as they are in Fig. 1.

Figure 8:
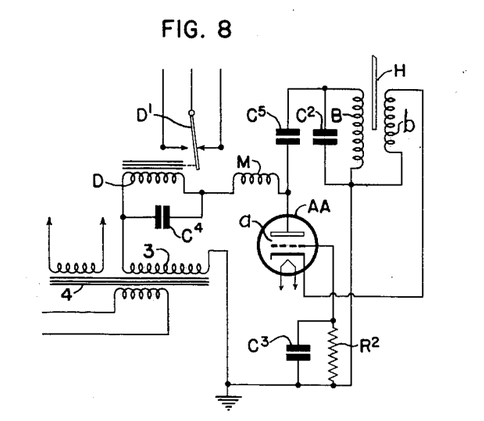

The modified arrangement shown in Fig. 8 is like the arrangement shown in Fig. 7 in omitting the triode valve $a'$ of Figs. 1 and 6. However, the Fig. 8 arrangement differs from that shown in Fig. 7 in the same manner as that arrangement shown in Fig. 6 differs from the arrangement shown in Fig. 1. Thus in Fig. 8 the tube AA is fed through a choke coil M, and the inductance coil B has one terminal connected to ground, and has its other terminal connected to the anode of the tube AA through a condenser $C_5$. In Fig. 8 as in the other figures, the condenser $C_2$ is connected in parallel with the coil B. In Fig. 8, as in Fig. 7, the omission of the non-oscillating valve $a'$ of Fig. 1, requires the valve $a$ to provide all, instead of a portion only of the current used in energizing relay winding D when the oscillation of the valve $a$ is interrupted.

Figure 9:
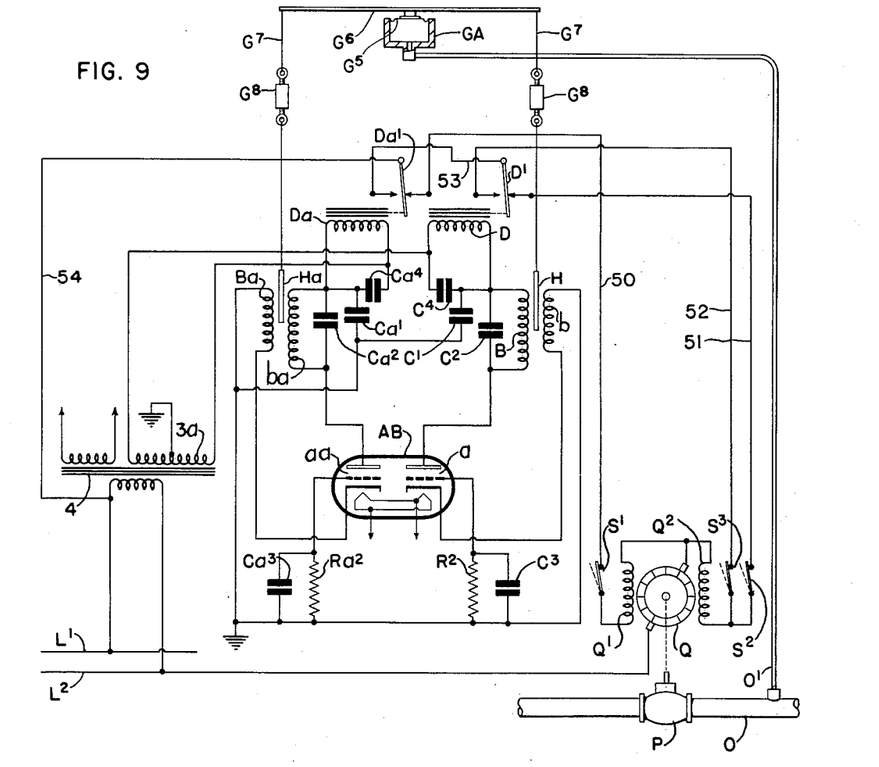

Fig. 9 illustrates a dual oscillator circuit arrangement in which two single triode, series fed oscillators of the type shown in Fig. 7 are combined. In the Fig. 9 arrangement, use is made of a twin triode tube AB which may be exactly like the tube A of Fig. 1, but in Fig. 9 an oscillating valve $aa$ replaces the non-oscillating valve $a'$ of Fig. 1. In Fig. 9, the circuit elements associated with the valve $aa$ are designated by reference symbols which differ from the corresponding elements associated with the valve $a$ by the addition of the letter $a$. In order that the oscillation of one of the triodes $a$ and $aa$ will not offset or interfere with the oscillation of the other, the two triodes are arranged to oscillate during alternate half cycles of the alternating current supplied by the transformer secondary winding $3a$. To this end, the winding $3a$ as shown, is a center tapped winding, one half of which supplies energizing current to the oscillator $a$ and its associated parts and the other half of which supplies energizing current to the oscillator $aa$ and its associated parts.

In the particular control arrangement illustrated by way of example in Fig. 9, the relays D and Da are combined and arranged to provide three-position control of the fluid pressure in a pipe O which receives fluid through a pressure-reducing valve P. As diagrammatically shown, the valve P is given opening and closing adjustments by the operation of a reversible relay motor Q in one direction, or in the opposite direction. As shown, the motor Q is a commutator type A. C. motor having one brush connected to the supply conductor $L^2$ and having its other brush connected to one terminal of each of two windings $Q'$ and $Q^2$. The second terminals of the windings $Q'$ and $Q^2$ are separately connected to the supply conductor $L'$ and the windings $Q'$ and $Q^2$ are thereby energized under different conditions, as hereinafter explained. The rotor Q rotates in the direction to give a closing adjustment to the valve P when the motor field winding $Q'$ is energized, and rotates in the direction to give the valve an opening adjustment when the field winding $Q^2$ is energized.

The control actions collectively effected by the relays D and Da result from adjustments of the vanes H and Ha effected on changes in the pressure in the pipe O by means responsive to that pressure. As shown, the pressure in the pipe O is transmitted by a tube O' to a pressure responsive device GA shown as a diaphragm device of conventional type having its upper wall formed by a flexible diaphragm $G^5$. As diagrammatically shown, the diaphragm $G^5$ supports a cross-bar $G^6$ having its opposite ends connected by links G⁷ to the vanes H and HA. The arrangement is such that as the pressure in the chamber GA increases the vanes H and HA are moved in the direction to set the valves $a$ and $aa$ into oscillation, and when the pressure transmitted to the chamber GA falls, the vanes H and H$a$ are moved in the direction required to interrupt the oscillation of each of the valves $a$ and $aa$. As indicated in the drawings, the vanes are so connected to the chamber GA that a reduction in the pressure in the pipe O may move the vane H far enough into the space between the coils B and $b$ to interrupt the oscillation of the valve $a$ before the vane H$a$ is moved far enough into the space between the coils B$a$ and $ba$ to interrupt oscillation of the valve $aa$.

The effect of an increase in the pressure in the pipe O to a predetermined maximum, is an adjustment of the vanes H and H$a$ into positions in which both valves $a$ and $aa$ are oscillating. The relay contacts D' and D$a$' then occupy the positions shown in Fig. 9 to which they are respectively biased when the corresponding relay windings are deenergized. In this condition of the apparatus, the relay contact D$a$' energizes the winding Q' of the motor Q and the latter operates to give a maximum closing adjustment to the valve P. That adjustment is terminated when the motor opens the normally closed limit switch S' in the energizing circuit for the winding Q'. As diagrammatically shown, the terminal of the field winding Q' not connected to a brush of motor Q is connected by a conductor 50 to the stationary relay contact engaged by the movable contact D$a$' when the relay winding D$a$ is deenergized. This energizes the winding Q' since the relay contact D$a$' is connected by a conductor 54 to the alternating current supply conductor L'.

As shown, the relay contact D' associated with the relay winding D is connected by a conductor 53 to the stationary relay contact which when the relay winding D$a$ is energized is engaged by the movable relay contact D$a$'. In consequence, on a decrease in the pressure in the pipe O to a predetermined intermediate value at which the valve $aa$ ceases to oscillate and the relay winding D$a$ is energized, the contact D$a$' moves to connect the contact D' through conductor 53, contact D$a$' and conductor 54 to supply conductor L'. This energizes the field winding Q² since the contact D' is then connected through conductor 51 to the terminal of the field winding Q² not directly connected to the motor brush. When its winding Q² is thus energized the motor Q gives a predetermined opening adjustment to the valve P. That adjustment is terminated when the motor opens a limit switch S² through which the conductor 51 is connected to the field winding Q².

If thereafter the pressure in the pipe O falls below its intermediate value to a predetermined low value, the resultant adjustment of the vane H interrupts the oscillation of the valve $a$ with the result that the relay contact D' is then moved into engagement with the cooperating, stationary relay contact connected by conductor 52 and limit switch S³ to the terminal of the field winding Q² not connected directly to a motor brush. The motor then gives a further opening adjustment to the valve P. That adjustment is terminated when the motor turns into the position in which it opens the limit switch S³.

In normal operation, the last opening adjustment of the valve P will be followed sooner or later by an increase in the pressure in the pipe O. The valve $a$ will resume oscillation as soon as the pressure rises about said intermediate value, and if and when the pressure increases to said predetermined high value, the oscillation of the valve $aa$ will be initiated and the motor will be set into operation in the direction to give a closing adjustment of the valve P. As will be apparent, the means for operating the limit switches S² and S³ are advantageously of a known type adapted to prevent each of those switches from closing after once being opened until the limit switch S' is again opened.

As diagrammatically shown in Fig. 9, each of the links G⁷ includes a turn buckle G⁸ for use in calibrating adjustments to insure the desired relation between the position of each vane and the pressure transmitted to the diaphragm chamber GA. In ordinary practice, a control system including two sets of inductance coils may well have the vane associated with each set of coils made angularly adjustable relative to the condition controlling element, by means of such a frictional connection between each vane and associated crank arm as is illustrated in Figs. 2, 3 and 4.

Figure 10:
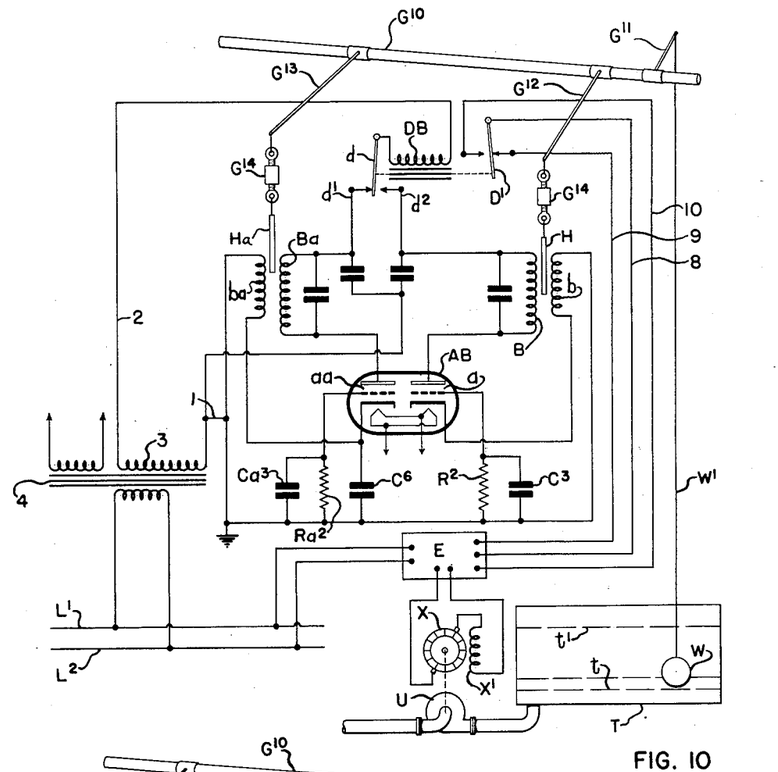

In Fig. 10 I have illustrated another embodiment of the invention in which use is made of a twin tube AB including two oscillating valves $a$ and $aa$, respectively associated with pairs of inductance coils B and $b$ and B$a$ and $ba$, respectively. The valves $a$ and $aa$ of Fig. 10 are not simultaneously set into oscillation and do not simultaneously cease to oscillate. In effect, each of the valves $a$ and $aa$ of Fig. 10 is associated with inductance coils, and an alternating source of plate current voltage, and a control grid ground connection as is the valve $a$ of Fig. 1. In Fig. 10, however, the two valves cannot be energized simultaneously although the plate circuits for the two valves comprise a common portion including the transformer secondary winding 3 and the single relay winding DB of the system. That relay winding when energized moves a movable relay contact D' out of engagement with one and into engagement with the other of a pair of spaced apart stationary relay contacts, as in Fig. 1. The relay including the winding DB of Fig. 10 also includes a second movable contact $d$. The contact $d$ is biased to a position assumed when the winding DB is deenergized in which it engages a stationary relay contact $d'$ connected through the inductance coil B$a$ to the anode of the valve $aa$. The anode of valve $aa$ is then connected to the terminal 2 of the transformer secondary 3 through the coil B$a$, relay contact $d$ and relay winding DB. When the winding DB is energized, it pulls the contact $d$ out of its bias position and into engagement with a second stationary contact $d^2$. The energization of the winding DB thus interrupts the supply of plate voltage to the valve $aa$, and at the same time connects the anode of the valve $a$ to the transformer terminal 2 through the coil B, the stationary relay contact $d^2$ then engaged by the relay contact $d$, and the relay winding DB. In the arrangement shown in Fig. 10, a detuning condenser C₆ which may have a capacity of 10 micromicrofarads, is advantageously connected in parallel with the inductance coil $ba$ so that the resonant periods of the two oscillation circuits are different whereby the oscillation of one circuit will not offset or interfere with the oscillation of the other. This same result may be obtained without requiring the use of condenser C₆ by employing inductance coils B, b and Ba, ba having unlike values of inductance.

The control circuit arrangement shown in Fig. 10 includes means for effecting the kind of control sometimes referred to as a differential control. That control is characterized by the fact that the controlling condition is permitted to fluctuate between two values which may be quite widely separated, and by the further fact that when the controlling condition reaches one of its limiting values a control action is initiated which acts in the direction to return the control condition to its second value. When the second value is attained, the control action is interrupted and no further control action is effected until the controlling condition again attains said one limiting value. The control operation is thus of the on-off type, but differs from the most usual on-off control in that the on and off values which respectively initiate and terminate the control action may be widely separated.

A differential control of the character just described, may be used with advantage for various purposes. One such use, diagrammatically illustrated in Fig. 10, is to control the supply of liquid to a storage chamber or vessel so that when the liquid surface therein falls to a predetermined low level a pump will be operated, or a valve will be opened, to supply liquid to the storage vessel until the latter is filled to a predetermined high level, whereupon the supply of liquid to the vessel is interrupted, to be resumed when the liquid level has again fallen to its predetermined low value.

As shown diagrammatically in Fig. 10, T designates a liquid storage vessel supplied with liquid by an intermittently operating pump U. The operation of the pump is directly controlled by the relay winding DB, and the energization and deenergization of that relay winding are controlled by the adjustment of the vanes H and Ha, and those adjustments are effected by a float W which moves up and down with the liquid level in the storage chamber T. As diagrammatically shown in Fig. 10, the float W is suspended through a link or stem W' from a crank arm $G^{11}$ carried by a rock shaft $G^{10}$. That shaft has arms $G^{12}$ and $G^{13}$, respectively connected through corresponding links to the vanes H and Ha, each of which is diagrammatically shown as including a turn buckle $G^{14}$.

The connection between the float W and the vanes H and Ha are so proportioned and arranged that the vane H extends into the space between the coils B and b so as to prevent oscillation of the valve a at all times, except when the tank has been emptied down to the low level line t, while the vane Ha does not extend far enough into the space between the coils Ba and ba to prevent oscillation of the valve aa, except when the tank has been filled to the high level line t'. The float and vanes H and Ha are so connected to the shaft $G^{10}$ that as the varying water level in the vessel T raises and lowers the float W, each of the vanes H and Ha respectively moves into and out of space between the corresponding pair of inductance coils.

By the time the liquid rises to the level t' in the vessel T in each refilling operation, the vane Ha has been moved far enough into the space between the coils Ba and ba to interrupt the oscillation of the valve aa. When the oscillation of the valve aa is thus interrupted, its plate current increases sufficiently to energize the relay winding DB. Thereupon the contact d is moved out of engagement with the contact d' and into engagement with the contact $d^2$. This results in an interruption in the supply of plate voltage to the valve aa and in the supply of plate voltage to the valve a. As the position of the vane H then prevents oscillation of the valve a, the latter maintains the energization of the relay winding DB and continues to do so until the liquid in the vessel T again falls to the low level t.

The energization of the relay winding DB effected when the oscillation of the valve aa is interrupted shifts the relay contact D' out of the position into which it is biased and in which it engages a stationary contact at its right into a position in which it engages a stationary contact at its left. As shown, the movable contact D' and associated stationary contacts are connected by relay conductors 8, 9 and 10 to an auxiliary relay E, as in Fig. 1. The relay E has input terminals connected to the supply conductors L' and $L^2$ and has its output terminals connected to the terminals of the energizing circuit of the motor X which drives the pump U. As diagrammatically shown, the motor energizing circuit includes a field winding X' and the two brushes of the motor X. On the energization of the relay winding DB occurring when the liquid in the vessel T rises to the level t', the relay conductors 8 and 10 actuate the auxiliary relay E to open the energizing circuit of the motor X and thus interrupt the operation of the pump U.

In normal operation the supply of liquid to the vessel T thus interrupted, is not resumed until the liquid in the vessel T falls to the low level t. The falling movement of the liquid surface in the vessel T results in a movement of the vane H in the direction to permit oscillation of the valve a, and by the time the surface has fallen to the level t the movement of the vane H out of the space between the coils B and b is sufficient to permit the valve a to oscillate. When that valve starts to oscillate, the energization of the relay winding DB is interrupted and the contact d moves into engagement with the stationary contact d', thus interrupting the supply of plate voltage to the valve a and supplying plate voltage to the valve aa which is thereby started into oscillation. With the valve aa in oscillation, the current flow through the winding DB is too small to reenergize that winding and the latter remains in its deenergized condition until the liquid level in the vessel T again reaches the high level t' and the vane Ha again interrupts the operation of the valve aa. When the relay winding DB is deenergized as just described, the contact D' moves into its biased position in which it connects the relay conductors 8 and 9 and thereby actuates the auxiliary relay E to close the energizing circuit for the motor X and start the pump into operation. The pump operation thus initiated continues until the liquid in the vessel T rises to the high level t' and thereby causes the vane Ha to interrupt the oscillation of the valve aa.

The arrangement shown in Fig. 10 will not fail safely when the tube AB becomes inoperative, since the contact D' and conductors 8 and 9 will then maintain the energizing circuit for the motor X in its closed condition. When the conditions of use make safe failure desirable when the tube AB of Fig. 10 becomes inoperative, the apparatus shown in Fig. 10 may be readily modified to insure such safe failure. Thus, for example, the float W may be connected to the shaft $G^{10}$ as shown in Fig. 11, so that the vanes H and Ha move into the spaces between the corresponding pairs of inductance coils as the fall in liquid level lowers the float W, and move out of said spaces when the rise in liquid level raises the float W.

In the Fig. 11 arrangement, the vanes H and Ha are relatively arranged and connected to the float W so that the vane Ha will permit oscillation of the valve aa at all times except when the float W is in or below the position which it assumes when the liquid level in the tank T is at the low level line t, and so that the vane H will prevent oscillation of the valve a at all times except when the float W is in or above the position which it assumes when the liquid level in the tank T is at the high level line t'.

Figure 11:
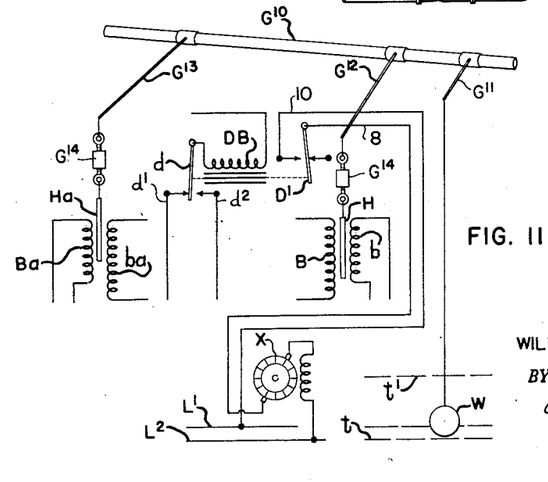
Fig. 11 is a diagram illustrating a modification of the arrangement shown in Fig. 10.

With the vanes H and Ha and float W of Fig. 11 relatively arranged as described, when the liquid level in the vessel T falls to the low level line t, the vane Ha moves into the position in which it interrupts oscillation of the valve aa and the vane H remains in a position in which it prevents oscillation of the valve a. The interruption in the oscillation of the valve aa results in the energization of the relay winding DB, and the movement of the contact D' into engagement with the stationary contact connected to the relay conductor 10. In consequence, the relay conductor 10 and the relay conductor 8 connected to the contact D' may then energize the motor X through an auxiliary relay, or may directly energize the motor X when the relay conductor 10 is connected to the supply conductor L' and the relay conductor 8 is connected to the supply conductor $L^2$ through the motor energizing circuit, as is diagrammatically shown in Fig. 11.

The energization of the motor X effected when the liquid level falls to the low level line t is maintained until the liquid level in the vessel T rises to the high level line t' and the vane H is thereby moved into the position in which it permits the oscillation of the valve a. Then, as during the previous period in which the liquid level was rising above the low level line t, the position of the vane Ha is such as to permit oscillation of the valve aa. In consequence, when the liquid level rises to the high level line t', the relay winding DB is deenergized and the contact D' moves under its bias force out of engagement with the stationary relay contact connected to the relay conductor 10, thereby deenergizing the motor X. The energizing circuit of the motor X will then remain open until the liquid level again falls to the low level line t. As the liquid level falls below the high level line t', the vane H moves into position to interrupt the oscillation of the valve a. This does not result in the energization of the motor X, since the position of the contact d is then such that the anode of the valve aa is connected to the plate voltage source. The energization of the motor X effected as a result of the interruption of the oscillation of the valve aa by the vane Ha when the liquid level falls to the line t, is not interrupted when the liquid level rises above the line t and the valve aa tends to oscillate again, since the resultant energization of the relay winding DB leaves the contact d in the position in which the anode of the valve aa is disconnected from the plate voltage source.

As will be apparent to those skilled in the art, the control systems illustrated diagrammatically by way of example in Figs. 1 and 6–11, may each be used for a wide variety of control purposes, and are readily capable of various modifications which may be desirable to adapt them to some particular conditions of use. Embodiments of the present invention of the character shown in Figs. 1 and 8 are adapted for use under practically all conditions in which it is desired to provide an on-off or two position control in accordance with movements of an element responsive to changes in a controlling condition and operative to adjust such a device as the vane H. Similarly, dual valve embodiments of the present invention, such as are shown in Figs. 9, 10 and 11 are adapted for use in various control systems in which three-position control, differential control or other controls effected in response to adjustments made of two controlling vanes, are desirable. In such dual valve arrangements the two vanes may be adjusted by separate links or adjusting parts or by a common link or adjusting part as conditions make desirable.

The generic idea of maintaining the control grid of an oscillating triode valve at a constant potential is not claimed herein as it did not originate with me but with James C. Mouzon, and is claimed in his application Serial No. 18,817, filed April 3, 1948, which application is a continuation in part of his earlier filed application, Ser. No. 694,399, filed August 31, 1946 and now abandoned.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent is:

1. The combination with two electronic valves each having an output circuit including an anode and a cathode and an input circuit including the associated cathode and a control grid, of a circuit network which includes a circuit portion at substantially constant potential, means connecting each control grid to said circuit portion comprising a resistance and a by-pass condenser in parallel with said resistance, a cathode resistance connecting the cathode of one of said valves to said circuit portion, two inductance coils in mutual inductive relation and included in the output circuit of the other of said valves, the cathode of said other valve being connected to said circuit portion through one of said coils, and a utilization device coupled to the output circuits of both of said valves.

2. The combination of claim 1 and means to vary the mutual inductance of said coils to thereby establish and interrupt oscillation of said other valve.

3. The combination with two electronic valves each having an output circuit including an anode and a cathode and an input circuit including the associated cathode and a control grid, of a circuit network which includes a circuit portion at substantially constant potential, a connection between each control grid and said circuit portion comprising a resistance and a by-pass condenser in parallel with said resistance, means connecting each cathode to said circuit portion, means cooperating with the output and input circuits of one only of said valves to establish oscillation of said one valve, and a utilization device coupled to the output circuits of both of said valves.

4. The combination with two electronic valves each having an output circuit including an anode and a cathode and an input circuit including the associated cathode and a control grid, of a circuit network which includes a circuit portion at substantially constant potential, a connection between each control grid and said circuit portion comprising a resistance and a by-pass condenser in parallel with said resistance, means connecting each cathode to said circuit portion, and means cooperating with the output and input circuits of one only of said valves to establish oscillation of said one valve.

5. The combination with two electronic valves each having an output circuit including an anode and a cathode and an input circuit including the associated cathode and a control grid, of a circuit network which includes a circuit portion at substantially constant potential, means connecting each control grid to said circuit portion, means connecting each cathode to said circuit portion, and means cooperating with the output and input circuits of one only of said valves to establish oscillation of said one valve.

6. In a control system, the combination with two valves each having an anode, a cathode and a control grid, of a source of alternating voltage having one terminal grounded and having its second terminal connected to the anodes of the two valves, an inductive element connecting the cathode of one of said valves to ground, a resistance connecting the cathode of the other valve to ground, a ground connection to each of the control grids of the valves comprising a resistance and a by-pass condenser in parallel therewith, and a feedback connection between the anode and cathode of said one valve adjustable to establish and interrupt oscillation of said one valve.

7. In a control apparatus, the combination with an electronic valve comprising an anode, a cathode and a control grid, and a source of energizing voltage having one terminal connected to ground, a utilization device and an inductance coil connected in series with said device between the second terminal of said source and said anode, a condenser connecting the connected ends of said coil and device to ground, a second inductance coil in mutual inductive relation with the first mentioned coil through which said cathode is connected to ground and a ground connection to said control grid comprising a resistance and a by-pass condenser through which said grid is maintained at the potential of the ground for alternating current operation, and means to vary the mutual inductance of said coils and thereby establish and interrupt oscillation of the valve.

8. In a control apparatus, the combination with an electronic valve comprising an anode, a cathode and a control grid, and a source of alternating energizing voltage having one terminal connected to ground, a utilization device and a choke coil connected in series with said utilization device between the second terminal of said source and said anode, a first inductance coil, a first condenser in parallel with said first inductance coil, each having one end connected to ground, a second condenser connecting the other ends of said first inductance coil and first condenser to said anode, a second inductance coil in mutual inductive relation with said first inductance coil through which said cathode is connected to ground and a ground connection to said control grid comprising a resistance and a by-pass condenser through which said grid is maintained at the potential of the ground for alternating current operation, and means operating in response to variations in a controlling conditions to vary the mutual inductance of said coils between a value at which the valve will, and a value at which the valve will not act as an oscillator generating high frequency alternating currents.

9. In a control apparatus, the combination with an electronic valve having an anode, a cathode and a control grid, of a circuit portion at a substantially constant potential, a source of energizing voltage having one terminal connected to said circuit portion, a utilization device and a radio frequency choke coil connected in series between the second terminal of said source and said anode, an inductance coil and a tuning condenser in parallel therewith and a condenser connecting the anode to said circuit portion, a second inductance coil connected between said cathode and circuit portion and in mutual inductive relation with the first mentioned inductance coil, a connection including a resistance between said control grid and circuit portion, and means adjustable to vary the mutual inductance of said coils between a value at which said valve oscillates and a value at which it does not oscillate.

10. In a control apparatus, the combination with an electronic valve having an anode, a cathode and a control grid of a circuit portion at a substantially constant potential, a source of energizing potential having one terminal connected to said circuit portion, a utilization device and inductance coil, conductively connected in series between the second terminal of said source and said anode, a tuning condenser connected in parallel with said inductance coil, a second inductance coil connected between said cathode and circuit portion and in mutual inductive relation with the first mentioned inductance coil, a connection between said control grid and circuit portion comprising a resistance and a by-pass condenser, means to vary the mutual inductance of said coils between a value at which said valve oscillates and a value at which it does not oscillate, and condenser means diverting oscillating currents from said utilization device and potential source.

11. In a control apparatus, the combination with an electronic valve having an output circuit including an anode and a cathode and an input circuit including a control electrode maintained at a substantially constant potential and including said cathode, of a source of energizing potential, a utilization device and two inductance coils included in said output circuit in series with the anode and cathode, said cathode being connected to said control grid through one of said coils, said coils being in mutual inductive relation, and means to vary the mutual inductance of said coils.

12. In a control apparatus, the combination with an electronic valve having an output circuit including an anode and a cathode and an input circuit including a control electrode maintained at a substantially constant potential and including said cathode, of a source of energizing potential, utilization device and two inductance coils included in said output circuit in series with one another and with the anode and cathode, said cathode being connected to said control grid by one of said coils and by a resistance and a condenser in parallel therewith connecting the last mentioned coil to said grid, said coils being in mutual inductive relation, and means to vary the mutual inductance of said coils.

13. An oscillator including an electronic valve having an output circuit including an anode and a cathode and an input circuit including a control electrode maintained at a substantially constant potential and including said cathode, and two inductance coils in mutual inductive relation and conductively connected in said output circuit in series with said anode and cathode, said cathode being connected to said control grid through one of said coils.

14. An oscillator including an electronic valve having an output circuit including an anode and a cathode and an input circuit including a control electrode maintained at a substantially constant potential and including said cathode, two inductance coils in mutual inductive relation and conductively connected in said output circuit in series with said anode and cathode, said cathode being connected to said control grid through one of said coils, and means to vary the mutual inductive relation between said coils.

15. In a control apparatus, the combination of first and second electronic valves each having an anode, a cathode and a control grid, a ground connection to the control grid of each valve comprising a resistance and a by-pass condenser in parallel with said resistance, a separate reactive impedance through which the cathode of each valve is connected to ground, a regulable feed-back connection between the input and output circuits of each valve including impedance adjustable between values at which the valve does and does not oscillate, a source of energizing voltage having one terminal connected to ground, a control device connecting the second terminal of said voltage source to the anode of the first valve or to the anode of the second valve accordingly as said control device is energized or deenergized, said control device being energized by each valve when the anode of the latter is connected to said second terminal of said source and the valve is not oscillating, and means actuated by said control device to produce one or another control effect accordingly as said control device is energized or deenergized.

16. In a control apparatus, the combination of first and second electronic valves each having an input circuit and output circuit, a regulable feedback connection between the input and output circuits of each valve including impedance adjustable between values at which the valve does and does not oscillate, means responsive to a controlling condition for adjusting said impedances to maintain said valves in oscillation during non-synchronous periods selectively dependent on the value of the controlling condition, a load device, energizing means for said load device and arranged for actuation by said first valve when the latter is not oscillating to energize said device if the latter is then deenergized and arranged for operation by said second valve when not oscillating to maintain the energization of said device after the latter has been energized by the first valve, and a control mechanism actuated by said device in one direction or the other accordingly as said device is energized or deenergized.

17. A control apparatus comprising in combination two oscillation circuits each including an electronic valve having an output circuit including an anode and a cathode and an input circuit including the associated cathode and a control grid maintained at a substantially constant potential, a common energizing source of alternating current for said output circuits, means to alternately connect said source to first one and then the other of said output circuits, two inductance coils in mutual inductive relation and included in the output circuit of one of said valves, the cathode of said one valve being connected to its associated control grid through one of said coils, two other inductance coils in mutual inductive relation and included in the output circuit of the other of said valves, the cathode associated with said other valve being connected to its associated control grid through one of said other coils, and a condenser connected across said one coil to render the resonant period of the oscillation circuit including said one valve different from the resonant period of the other oscillation circuit.

18. The combination of two electronic valves each having an output circuit including an anode and a cathode and a control grid, a circuit network which includes a pair of terminals adapted for connection to a source of energizing current, means connecting each control grid to one of said terminals comprising a resistance and a by-pass condenser in parallel with said resistance, a cathode resistance connecting the cathode of one of said valves to said one terminal, the anode of said one valve being connected to the other terminal of said pair of terminals, two inductance coils in mutually inductive relation and included in the output circuit of the other of said valves, the cathode of the other valve being connected to said one terminal through one of said coils, the anode of said other valve being connected to said other terminal through said other coil, and a utilization device coupled to the output circuits of both of said valves.

WILLIAM H. WANNAMAKER, Jr.

REFERENCES CITED

The following references are of record in the file of this patent:

UNITED STATES PATENTS

| Number | Name | Date |
| --- | --- | --- |
| 1,838,084 | Drake | Dec. 29, 1931 |
| 2,022,067 | Wheeler | Nov. 26, 1935 |
| 2,169,977 | Macdonald | Aug. 15, 1939 |
| 2,234,184 | MacLaren, Jr. | Mar. 11, 1941 |
| 2,347,826 | Heisner | May 2, 1944 |
| 2,411,247 | Cohen | Nov. 19, 1946 |
| 2,411,573 | Holst et al. | Nov. 26, 1946 |
| 2,468,138 | Terry | Apr. 26, 1949 |
| 2,470,573 | Moore | May 17, 1949 |

OTHER REFERENCES

RCA Mdg. Co., Inc., application note No. 108 November 13, 1940, Fig. 1a.